Figure 2:
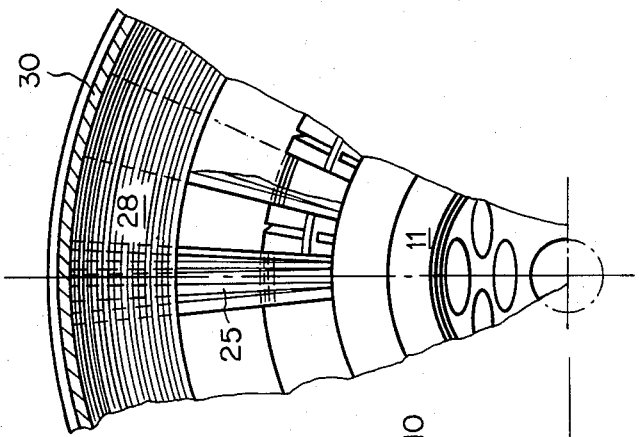

United States Patent [19]

Laing

[11] Patent Number: 4,644,208

[45] Date of Patent: Feb. 17, 1987

[54] STATOR HAVING A SPIRAL YOKE

[76] Inventor: Nikolaus Laing, 632 Marsat Ct., Chula Vista, Calif. 92011

[21] Appl. No.: 668,772

[22] Filed: Nov. 2, 1984

[51] Int. Cl.$^4$ ............................................. H02K 17/00
[52] U.S. Cl. ..................................... 310/166; 310/157; 310/254; 310/216
[58] Field of Search ................................. 310/216–218, 310/157, 166, 254, 259, 190–193, 261; 417/420, 417/424, 410; 415/54

[56] References Cited

U.S. PATENT DOCUMENTS

| 3,447,469 | 6/1969 | Laing | 310/166 X |
| 3,558,948 | 1/1971 | Laing | 310/157 |
| 3,581,132 | 5/1971 | Laing | 310/166 |
| 3,732,445 | 5/1973 | Laing | 310/166 X |
| 3,741,690 | 6/1973 | Laing | 310/166 |
| 3,814,963 | 6/1974 | Laing | 310/254 X |
| 4,051,401 | 4/1977 | Hayward | 310/254 X |

FOREIGN PATENT DOCUMENTS

| 2246418 | 5/1973 | Fed. Rep. of Germany | 310/157 |
| 2262867 | 7/1974 | Fed. Rep. of Germany | 310/157 |

Primary Examiner—Mark O. Budd
Attorney, Agent, or Firm—Pennie & Edmonds

[57] ABSTRACT

An induction motor for a motor-centrifugal pump unit has a stator shaped to provide a spherical airgap. The stator winding lies between teeth which extend radially of the spherical stator surface. The teeth are formed of built up strips of magnetic laminations wound in a spiral and placed against the stator yoke.

11 Claims, 2 Drawing Figures

STATOR HAVING A SPIRAL YOKE

The invention refers to electric motors, espcially those forming one unit with centrifugal pumps, in which the stator yoke is made as a spiral of magnetic lamination.

Electric motors built up from stator laminations shaped with polar symmetry are not suitable for electric motors in which the airgap runs along the surface of a sphere or of a cone. But electric motors having spherical airgaps are increasingly gaining in importance. The invention is aimed in particular at motors of that kind.

The stator yoke of electric motors is the member which determines the diameter of an electric motor. The stator yoke must exhibit approximately the same cross-sectional area in a radial plane as the rotor of the motor. Since the stator yoke runs outside the windings, the diameter and therefore the consumption of material for leading back the magnetic flux, particularly in the case of two-pole motors, is very large.

Hitherto for spherical motors stators having teeth running in parallel with the axis have been used, which lead to an unconventional winding technique and exhibit great axial length and thereby high stray losses.

The invention avoids both the very high consumption of material by the stator yoke and also the great structural length of motors having teeth parallel with the axis.

In accordance with the invention teeth formed from sections of lamination are arranged round the airgap, between which windings are arranged, which are constructed after the same style as with conventional induction motors. But the windings of the stators in accordance with the invention may also be produced according to the same method as in the case of the rotors of d.c. motors by conventional armature winding machines. The teeth exhibit an edge lying in a plane of rotation and the spiral of laminations fits against this edge and takes over the magnetic return path.

The invention also refers to centrifugal pumps which form one unit with the motors in accordance with the invention.

The invention is to be explained with respect to a Figure.

Figure 1:
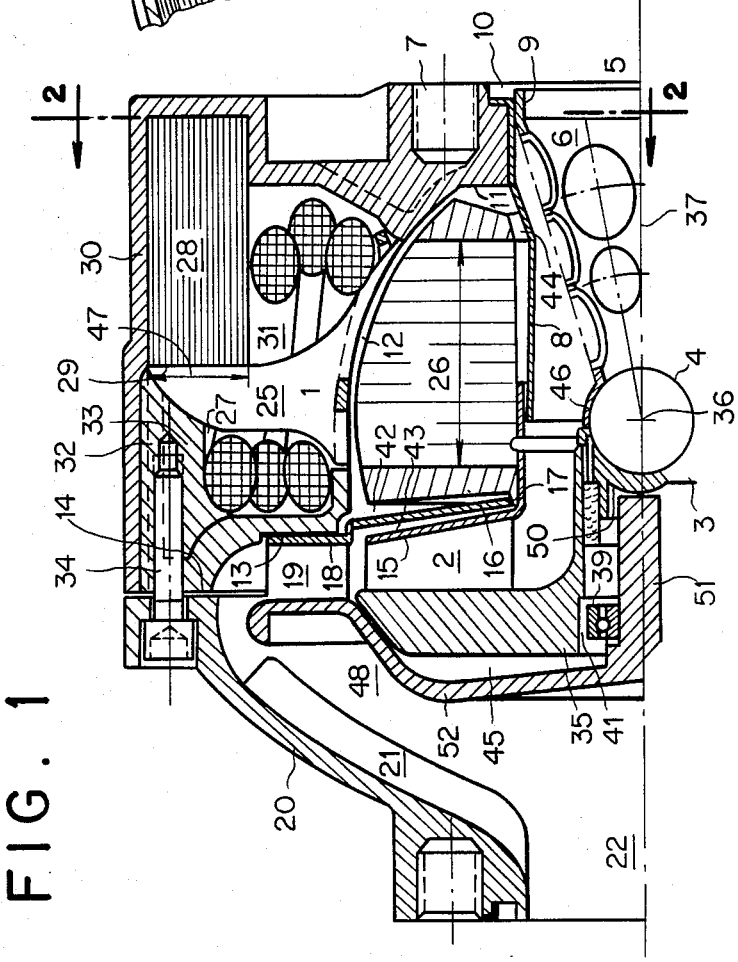

FIG. 1 shows in section a motor-centrifugal pump unit in accordance with the invention; and FIG. 2 shows a section along the line of section I—I with the omission of the wall of the casing and the winding.

The rotor 1 forms with the impeller 2 one unit arranged to be able to rotate, which is supported by the bearing cap 3 upon the ball 4 which is arranged stationary. The entry of the flow medium is effected through the perforated cone 6 which ends in a flange 5 having fixing holes 7. A stationary tube 8 forms together with the cylindrical region 9 of the cone 6 the seating 10 for a sealing ring. The dividing wall 11 of spherical formation in the gap 12 for the magnetic flux is connected to the tube 8 by welding. This dividing wall continues into an annular region 13 and ends in the flange 14. Between the rotor 1 and the blade cover 15 a stationary wall 16 is inserted, which forms a gap with a spherical region 17 of the rotor 1 and the plane annular region 18 of which is held in its position by the vane ring 19. The flow medium leaving the vane ring 19 is slipped through the pump casing 20 having the blading 21 for absorbing the angular momentum, to the outlet region 22.

As also illustrated in FIG. 2, the stator of the motor consists of stator teeth 25 which are arranged with uniform distribution over the circumference of the dividing wall 11 and which are formed from sections of lamination lying side by side in the circumferential direction. These teeth are widened at the end next the rotor 1 so that they overlap the whole axial length 26 of the iron region of the rotor 1. In the axial region 27 pointing outwards the edges of these teeth lie in an axial annular region. Against this annular region fits a stator yoke having a spiral 28 wound from magnetic lamination, the annular surface 29 of which is advantageously ground plane.

The motor casing consists of the pot-shaped part 30 in which after introduction of the winding 31 the flange 32 is fixed by screwing.

In the flange 32 ears 33 are cast, distributed round the circumference for screwholes. The pump casing 20 is fastened to the motor casing 30/32 by the screws 34.

The wheel disc 35 of the impeller 2 is made with a thick wall of such a weight that the excess weight of the rotor 1 referred to the centre 36 of the ball is compensated. By this means the rotor-impeller unit 1, 2 may be driven in space in any position of the rotor axis 37. The stablization of the rotor 1 is effected through the magnetic forces. If the motor is switched off this stabilizing force vanishes. A bearing 39 consisting preferably of plastics but which may also be made as a ball bearing, restricts the amplitude of the angle of wobble.

The gap 41 between the supporting bearing 39 and the rotor 2 is so dimensioned that in the gaps 42, 43, 44, 45 and 46 no contact can take place.

The cavities 47 remaining between the windings 31 are filled with a hardening resin by which the hydrostatic forces emanating from the pump casing 48 are absorbed, and by which at the same time the transfer of heat to the delivery flow is favoured.

I claim:

1. An induction motor, in particular a motor-centrifugal pump unit having a stator the airgap of which runs along a spherical surface and the winding of which is arranged between teeth which take over the conduction of the magnetic flux between the rotor and the stator yoke, characterized in that the teeth (25) extend radially from the spherical surface and exhibit, lying in a plane of rotation adjacent the axial extent of the rotor regions (27) against which fits a stator yoke (28) which is built up from a strip of magnetic lamination running along a spiral line.

2. An induction motor according to claim 1 characterized in that the teeth (25) consist of a plurality of stacked sections of laminations, the central lamination of a stack in each case running along a radial plane and the surrounding laminations tapering inward toward the air gap.

3. An induction motor-centrifugal pump unit as in claim 1, characterized in that a tube (8) separating the suction side (5) from the pressure side forms with the inside of the bore in the rotor (1) a gap which runs in the plane of rotation (37) associated with the geometric centre (36) of the spherical air gap.

4. An induction motor-centrifugal pump unit as in claim 1, having an air gap running along a spherical surface and an impeller, characterized in that the impeller (2) exhibits a wall thickness (35) exceeding that required by the strength, so that the centre of gravity of the mass of the rotating rotor-impeller unit (1, 2) coincides with the centre (36) of the spherical air gap.

5. An induction motor-centrifugal pump unit as in claim 1, characterized in that the rotor has a predetermined axial length of magnetic iron and the teeth (25) at their ends next the rotor (1) exhibit widening to form pole shoes over an axial distance predetermined by the length (26) of magnetic iron of the rotor (1).

6. An induction motor-centrifugal pump unit as in claim 1, characterized in that between the rotor (1) which drives an impeller and the impeller (2) runs a gap (42, 43) into which a stationary wall (16) projects.

7. An induction motor-centrifugal pump unit as in claim 1, characterized in that its casing consists of a pump casing shell (20), a stator casing (30) made in the shape of a bell, and a flange (32) which is connected firmly to the stator casing (30).

8. An induction motor-centrifugal pump unit having a spherical air gap as in claim 1 having a stator and a pump chamber, characterized in that the greatest diameter of the rotor (1) lies in the plane of rotation (37) containing the geometric centre (36) of the spherical air gap a dividing wall (11) separating the pump chamber from the stator runs along a sphere and after reaching the greatest diameter tapers in again until the inner diameter of the dividing wall (1) coincides with the maximum diameter of the rotor.

9. An induction motor, in particular a motor-centrifugal pump-unit, having a stator with windings and a rotor, rotating around an axis, between them is an air gap which runs along a spherical surface, and the winding of said stator is arranged between teeth composed of thin layers of sheet metal that conduct the magnetic flux through an iron part of the rotor, a widened base at the inner region of said tooth, extending along the length of said iron part of the rotor, and a stator yoke composed of thin layers of sheet metal that conduct the magnetic flux through an iron part of the rotor, whereby the layers of the teeth (25) are nearly radially arranged and each layer possesses in its outer region an edge (29) perpendicular to said axis (37), this edge (29) fits against a nearly cylindrical yoke (28), made of a spirally wound metal strip, so that the strips of the yoke (28) are aligned perpendicular to each layer of each tooth.

10. An induction motor as in claim 9, wherein the axial plane (29) of the cylindrical yoke (28) facing the radial part of the edge of the tooth is grounded.

11. An induction motor as in claim 9 having a motor compartment and a pump compartment whereby the winding (31) is in thermal contact with the wall (32), which is between the dry motor compartment, containing the teeth (25), winding (31), and the yoke (28), and the wet pump compartment (48).

* * * * *